United States Patent
Zhao et al.

(10) Patent No.: US 9,302,927 B2
(45) Date of Patent: Apr. 5, 2016

(54) VACUUM MELTING FURNACE FOR INFRARED GLASS AND MELTING SYSTEM AND METHOD THEREOF

(71) Applicant: China Building Materials Academy, Beijing (CN)

(72) Inventors: Huifeng Zhao, Beijing (CN); Chengkui Zu, Beijing (CN); Bin Han, Beijing (CN); Yonghua Liu, Beijing (CN); Jiang Chen, Beijing (CN); Yanhang Wang, Beijing (CN); Yangli Jin, Beijing (CN); Hua Zhao, Beijing (CN)

(73) Assignee: CHINA BUILDING MATERIALS ACADEMY, Beijing (CN)

( * ) Notice: Subject to any disclaimer, the term of this patent is extended or adjusted under 35 U.S.C. 154(b) by 73 days.

(21) Appl. No.: 14/306,922

(22) Filed: Jun. 17, 2014

(65) Prior Publication Data
US 2015/0266763 A1    Sep. 24, 2015

(30) Foreign Application Priority Data

Mar. 20, 2014 (CN) .......................... 2014 1 0106152

(51) Int. Cl.
*C03B 5/033* (2006.01)
*C03B 5/187* (2006.01)
(Continued)

(52) U.S. Cl.
CPC .............. *C03B 5/187* (2013.01); *C03B 5/0334* (2013.01); *C03B 5/43* (2013.01); *C03B 2201/60* (2013.01)

(58) Field of Classification Search
CPC ...... C03B 5/2252; C03B 5/0334; C03B 5/18; C03B 5/187; C03B 5/033; C03B 5/42
See application file for complete search history.

(56) References Cited

U.S. PATENT DOCUMENTS 1,537,036 A * 5/1925 Miller .................... C03B 5/021
                                                            373/36
1,581,829 A * 4/1926 Berry .................... C03B 5/2252
                                                            373/28
(Continued)

FOREIGN PATENT DOCUMENTS

CN    103232161 A    8/2013
CN    103359916 A    10/2013
(Continued)

OTHER PUBLICATIONS

English language machine translation of CN103359916B—Accessed Feb. 8, 2015 at ESP@CENET.*
(Continued)

*Primary Examiner* — Jason L Lazorcik
(74) *Attorney, Agent, or Firm* — Birch, Stewart, Kolasch & Birch, LLP

(57) ABSTRACT

A vacuum melting furnace for infrared glass, includes an upper furnace body and a lower furnace body that can be connected with each other or isolated from each other. Vacuum melting of the infrared glass is achieved in the upper furnace body wherein the influence of water in the environment is eliminated. The vacuum negative pressure environments can promote separation of hydroxyl in the structure, which achieves removing of hydroxyl in the glass, and then discharging of the molten infrared glass is conducted at atmospheric pressure in the lower furnace body. By using the vacuum melting furnace for infrared glass, infrared glass with good spectrum transmission performance can be obtained with improved property stability and optical homogeneity, which facilitates the preparation and molding of large sized and special-shaped infrared glass products.

19 Claims, 3 Drawing Sheets

(51) Int. Cl.
*C03B 5/225* (2006.01)
*C03B 5/42* (2006.01)
*C03B 5/43* (2006.01)

(56) References Cited

U.S. PATENT DOCUMENTS

| | | | | |
|---|---|---|---|---|
| 3,669,435 | A * | 6/1972 | Silverberg | C03B 5/08 432/151 |
| 3,837,825 | A * | 9/1974 | Loxley | C03B 19/06 264/662 |
| 3,841,384 | A * | 10/1974 | Tingquist | B22D 27/045 164/122.1 |
| 3,972,704 | A * | 8/1976 | Loxley | C03B 19/06 165/236 |
| 4,195,982 | A * | 4/1980 | Coucoulas | C03B 5/021 264/526 |
| 5,045,507 | A * | 9/1991 | Tran | C03B 5/08 501/40 |
| 5,334,232 | A * | 8/1994 | France | C03B 5/06 501/40 |
| 5,335,711 | A * | 8/1994 | Paine | B22D 27/13 164/120 |
| 5,746,801 | A * | 5/1998 | Fukuda | C03B 5/0334 65/29.15 |
| 5,772,714 | A * | 6/1998 | Sato | C03B 5/021 65/17.3 |
| 6,014,403 | A * | 1/2000 | Braglia | C03B 5/021 219/635 |
| 6,443,213 | B1 * | 9/2002 | Graham | C30B 11/00 164/122.1 |
| 6,634,189 | B1 * | 10/2003 | Hudgens | C03B 5/02 501/40 |
| 7,448,428 | B2 * | 11/2008 | Graham | B22D 21/005 164/122.1 |
| 2004/0206119 | A1 * | 10/2004 | Syllaios | C03B 5/02 65/29.21 |
| 2004/0206121 | A1 * | 10/2004 | Autery | C03B 5/02 65/83 |
| 2004/0206122 | A1 * | 10/2004 | Autery | C03B 11/08 65/83 |
| 2005/0092231 | A1 * | 5/2005 | Hawtof | C30B 29/12 117/81 |

FOREIGN PATENT DOCUMENTS

| | | |
|---|---|---|
| CN | 203741207 U | 7/2014 |
| EP | 0158974 A1 | 10/1985 |

OTHER PUBLICATIONS

Chinese Office Communication for corresponding Chinese Application No. 201410106152.X dated Sep. 2, 2015 (with English translation).

* cited by examiner

VACUUM MELTING FURNACE FOR INFRARED GLASS AND MELTING SYSTEM AND METHOD THEREOF

TECHNICAL FIELD

The present invention relates to a vacuum melting furnace for infrared glass and melting system and method thereof, belonging to melting technical field for infrared glass.

BACKGROUND ART

Infrared glass has many characteristics such as good optical uniformity, high mechanical strength and hardness, simple preparation and processing process, low production cost and so on, and thus can be used in molding and processing of large sized and special-shaped infrared devices such as optical window and dome having a diameter larger than 300 mm, and is adapted to be used as infrared cowling and detection window for various missiles and pods. So far, infrared glass mainly comprises quartz glass, silicate glass, germanate glass, tellurite glass, calcium aluminate glass and non-oxide glass such as chalcogenide glass and so on. However, infrared glass is easily to be polluted by water in environment during production process, thus causing reduction of infrared transmission performance. Therefore, how to eliminate water in the glass production process becomes a key problem to obtain high quality infrared glass.

SUMMARY OF THE INVENTION

The present invention aims to solve the technical problem that the vacuum melting method and device for infrared glass in prior art can not effectively eliminate water in the glass structure and thus can hardly produce high quality infrared glass, and provides a vacuum melting furnace for preparing infrared glass with good infrared transmission performance.

In order to solve the above mentioned technical problem, an embodiment of the present invention provides a vacuum melting furnace for infrared glass, comprising:

a furnace body, comprising an upper furnace body and a lower furnace body located below the upper furnace body; a bottom portion of the upper furnace body being in connection with a top portion of the lower furnace body via a communication passage; the furnace body being provided with a lockable furnace door, and being provided with a heater on a sidewall thereof;

a vacuum pumping device in connection with the upper furnace body and the lower furnace body respectively;

a crucible arranged inside the furnace body;

a lifting device arranged in connection with the crucible and adapted to drive the crucible to move up and down within the furnace body; the communication passage having a dimension adapted to allow the crucible to pass through; and a stirrer arranged inside the upper furnace body and adapted to extend into the crucible for stirring as the crucible moves up into the upper furnace body;

the communication passage is provided with a gate valve thereon for isolating the upper furnace body from the lower furnace body, and the lower furnace body is provided with a charging port thereon.

According to an embodiment of the present invention, the upper furnace body is provided with an upper heater on an inner side of furnace wall thereof, the lower furnace body is provide with a lower heater on an inner side of furnace wall thereof, and the upper furnace body and the lower furnace body are respectively provided with a thermocouple therein.

According to an embodiment of the present invention, the vacuum pumping device is in connection with the upper furnace body via an upper pipeline which is provided with an upper vacuum valve thereon, and is in connection with the lower furnace body via a lower pipeline which is provided with a lower vacuum valve thereon.

According to an embodiment of the present invention, the upper heater and the lower heater are both resistance heaters, and the resistance heater is in connection with a three-phase power supply system via a copper electrode, and the lower heater is a high temperature iron-chromium-aluminum heating wires.

A heat shield is further arranged outside the upper heater.

The present invention also provides a melting system for infrared glass, comprising an atmospheric melting furnace and the vacuum melting furnace.

The present invention also provides a melting method for infrared glass using the melting system, which comprises following steps:

(1) weighing out various glass raw materials and mixing them to form a glass batch which is then placed into an atmospheric melting furnace for melting under atmospheric pressure conditions to form a molten glass which is then cooled and pulverized to form an infrared glass cullet used for vacuum melting;

(2) opening the furnace door of the vacuum melting furnace, and putting the infrared glass cullet into the crucible;

(3) opening the gate valve, moving the crucible upward into the upper furnace body by means of the lifting device, closing the furnace door, and performing vacuum pumping on the upper furnace body and the lower furnace body by means of the vacuum pumping device to maintain a vacuum degree of 0.1-1 Pa inside the upper furnace body and the lower furnace body;

(4) heating the upper furnace body by means of the heater to maintain a temperature of 1300-1400° C. inside the upper furnace body until the infrared glass cullet melts completely;

(5) after the infrared glass cullet melts completely, starting the stirrer to allow the infrared glass homogenizing and fining; and (6) after completion of the step (5), moving the crucible downward into the lower furnace body by means of the lifting device, closing the gate valve and stopping vacuum pumping on the lower furnace body, opening the charging port and charging air into the lower furnace body until restoring atmospheric pressure, opening the furnace door, and taking out the crucible for discharging at atmospheric pressure.

In the step (6), the lower furnace body is heated by the heater to maintain a temperature of 800-1200° C. inside the lower furnace body.

In the step (5), after the infrared glass cullet melts completely, the vacuum degree inside the upper furnace body is increased to 0.001-0.01 Pa and the temperature is increased to 1400-1600° C. before starting the stirrer; and in the step (6), after closing the gate valve, the vacuum degree inside the upper furnace body is restored to 0.1-1 Pa.

After completion of discharging at atmospheric pressure in the step (6), new infrared glass cullet is put into the crucible, then the furnace door is closed, and the lower furnace body is kept a vacuum degree of 0.1-1 Pa by performing vacuum pumping; so a continuous production is achieved by repeating the steps (3)-(6).

Compared with the prior art, the technical solution of the present invention has following advantages:

(1) The vacuum melting furnace for infrared glass of the present invention comprises an upper furnace body and a lower furnace body which are independent from each other and can be connected with each other or isolated from each other according to needs, so that vacuum melting of the infrared glass is achieved in the upper furnace body and influence of water in environment is eliminated completely, besides, the vacuum negative pressure environment can promote separation of hydroxyl in the structure, achieving removing of hydroxyl in the glass structure, and thus really eliminating water during the glass preparation process to facilitate producing high quality infrared glass. Further, in the device of the present invention, the crucible can be moved up and down between the upper furnace body and the lower furnace body, and after completion of vacuum melting step, the crucible containing the molten infrared glass is moved into the lower furnace body, the furnace door is opened to allow the furnace body to be opened to the atmosphere, and finally the crucible is took out for discharging at atmospheric pressure, which facilitates various processing operations such as pressing, casting, centrifugation molding and so on, and further meets the requirements for molding of large sized and special-shaped infrared glass products. Compared with the vacuum melting method and device for infrared glass in prior art which cannot effectively eliminate water during the glass preparation process and thus can hardly produce high quality infrared glass, the device of the present invention not only facilitates obtaining infrared glass with good infrared transmission performance but also can achieve preparation of large sized infrared glass products and various infrared glass products having various special-shaped shape such as plate shape, dome shape, cylindrical shape and so on.

(2) The vacuum melting furnace for infrared glass of the present invention adopts resistance heating mode, and preferably uses thermocouple as temperature detection system, while in comparison, the melting device for infrared glass in prior art adopts optical temperature detection system which has a poor temperature field uniformity, so stripes and crystallization are easily caused in the glass products, effecting optical homogeneity of the glass. The device of the present invention adopts resistance heating mode, thus ensuring temperature uniformity inside the furnace chamber, effectively improving optical homogeneity and stability of the infrared glass, having advantages such as minor temperature measurement error and high control precision, and facilitating precise control of temperature and control of homogeneity during the melting process.

(3) The melting method for infrared glass of the present invention adopts atmospheric melting furnace to pretreat the infrared glass raw materials at atmospheric pressure, so as to effectively avoid loss of powder glass raw materials which is very easily pumped out by the vacuum pumping device during vacuum pumping, and also to eliminate spattering of the glass raw materials at vacuum conditions due to acute outgassing of reactions, which ensures composition and property uniformity of the finally obtained glass products.

(4) In the melting method for infrared glass of the present invention, the molten infrared glass obtained after vacuum melting is discharged in atmospheric environments at atmospheric pressure, which facilitate meeting the requirements for molding of large sized and special-shaped infrared glass products, and when combining with use of proper moulds or means for molding of glass, preparation of large sized and special-shaped infrared glass products, such as optical window having a dimension of 400×400 mm, dome cover having a diameter of 300 mm and so on, can be realized.

BRIEF DESCRIPTION OF THE DRAWINGS

In order to make the present invention more easily and clearly understood, detailed description is further presented below, with reference of accompanying drawings, wherein.

Wherein, the markings in the accompanying drawings are explained as follows: 1—stirrer, 2—observation window, 3—upper furnace body, 4—thermocouple; 5—crucible, 6—gate valve, 7—lower furnace body, 8—furnace door, 9—vacuum feeding hopper, 10—heat shield, 11—upper heater, 12—upper vacuum valve, 13—vacuum pumping device, 14—lower vacuum valve, 15—thermocouple, 16—lower heater, 17—charging port, 18—lifting device.

DETAILED DESCRIPTION OF EMBODIMENTS

Embodiment 1

Figure 1:
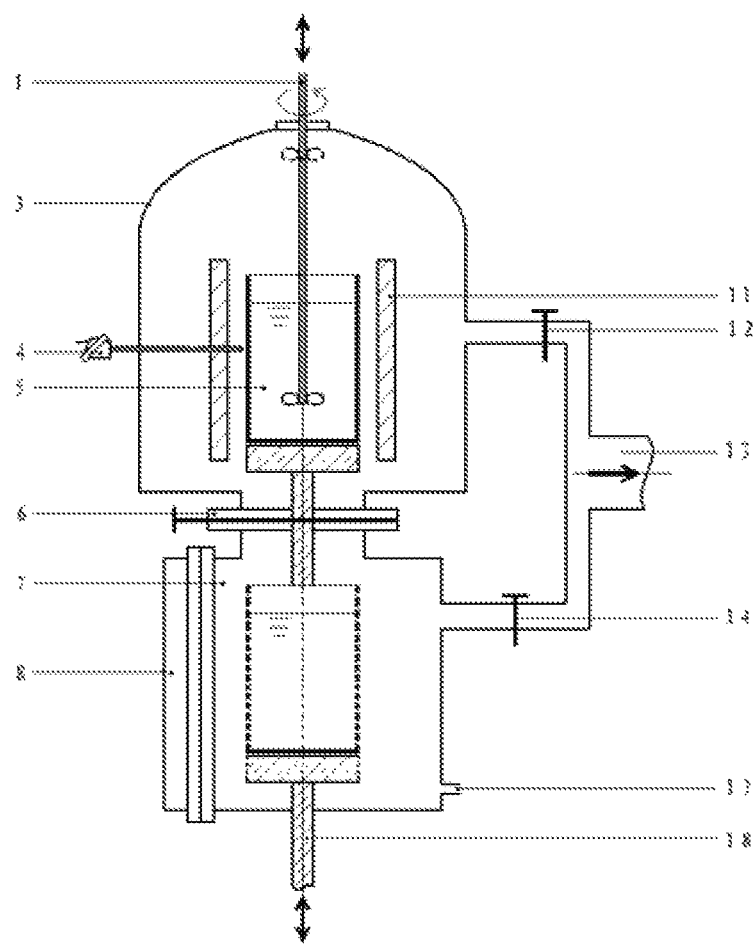
FIG. 1 is a structure schematic of the vacuum melting furnace for infrared glass of the present invention.

The vacuum melting furnace for infrared glass of this embodiment as shown in FIG. 1, comprises a furnace body comprising an upper furnace body 3 and a lower furnace body 7 located below the upper furnace body. Both of the upper furnace body and the lower furnace body are made from heat-resistant stainless steel materials. A bottom portion of the upper furnace body 3 is in connection with a top portion of the lower furnace body 7 via a communication passage. The lower furnace body 7 is provided with a lockable furnace door 8 and a charging port 17, and the upper furnace body is provided with an upper heater 11 on a sidewall thereof. The upper heater 11 is led out from one side of the furnace body via a water cooled copper electrode so as to be connected with a three-phase power supply system. The upper heater 11 is made from high temperature resistant metal tungsten which allows a long term use under high temperature conditions, so as to meet the requirements for vacuum melting of the infrared glass.

The vacuum melting furnace for infrared glass of this embodiment further comprises a vacuum pumping device 13. The vacuum pumping device 13 is in connection with the upper furnace body 3 via an upper pipeline provided with an upper vacuum valve 12 thereon, and is in connection with the lower furnace body 7 via a lower pipeline provided with a lower vacuum valve 14 thereon.

The vacuum melting furnace for infrared glass of this embodiment further comprises a crucible 5 arranged inside the furnace body. The crucible 5 is alternatively made from materials chosen from high temperature resistant ceramics, platinum, and platinum-rhodium alloy. A stirrer 1 is arranged on a top portion of the upper furnace body 3. The stirrer 1 is adapted to extend into the crucible 5 for rotating and stirring, and is adapted to move up and down in a vertical direction.

The vacuum melting furnace for infrared glass of this embodiment further comprises a lifting device 18 arranged in connection with the crucible and adapted to drive the crucible to move up and down within the furnace body. The lifting device 18 is made from heat resistant stainless steel materials, and is provided with a circular platform on a top portion thereof for supporting the crucible 5. The crucible 5 is placed on the lifting device 18 so as to move up and down together in a vertical direction under driving by a motor located on a lower portion of the furnace body.

Wherein, the communication passage has a dimension adapted to allow the crucible to pass through, and is provided with a gate valve 6 thereon for isolating the upper furnace body 3 from the lower furnace body 7. The gate valve 6 is arranged on a middle portion of the furnace body, used for separating the furnace body into an upper furnace body 3 and a lower furnace body 7, and for controlling to connect or cut off the communication of the upper furnace body 3 and the lower furnace body 7, thus allowing the upper furnace body 3 to be still maintained at a vacuum state when the lower furnace body 7 is opened to the atmosphere.

Further, the melting method for infrared glass provided in this embodiment comprises following steps:

(1) following glass raw materials are weighed out accurately: 4.7 g gallium oxide, 4.0 kg calcium carbonate, 1.2 kg barium carbonate, 0.8 kg germanium oxide, 0.5 kg magnesium oxide, 0.3 kg sodium carbonate, and then they are mixed uniformly to form gallate infrared glass batch, which is then placed into an atmospheric melting furnace for melting under atmospheric pressure conditions to form a molten glass which is then cooled and pulverized to form an infrared glass cullet;

(2) the furnace door 8 of the vacuum melting furnace is opened, and the infrared glass cullet is put into the crucible 5;

(3) the gate valve 6 is opened, then the crucible 5 is moved upwardly into the upper furnace body 3 by means of the lifting device, the furnace door 8 is closed, and vacuum pumping is performed on the upper furnace body 3 and the lower furnace body 7 by means of the vacuum pumping device 13 to maintain a vacuum degree of 0.1 Pa inside the upper furnace body and the lower furnace body;

(4) the upper furnace body 3 is heated by means of the upper heater 11 to maintain a temperature of 1300° C. inside the upper furnace body until the infrared glass cullet melts completely;

(5) after the infrared glass cullet melts completely, the stirrer 1 is started to allow the infrared glass homogenizing and fining; and (6) after completion of the step (5), the crucible is moved downward into the lower furnace body 7 by means of the lifting device 18, then the gate valve 6 is closed, vacuum pumping on the lower furnace body 7 is stopped, then the charging port 17 is opened and air is charged into the lower furnace body 7 until it restores atmospheric pressure, then the furnace door 8 is opened, and the crucible 5 is taken out for discharging at atmospheric pressure.

Embodiment 2

Figure 2:
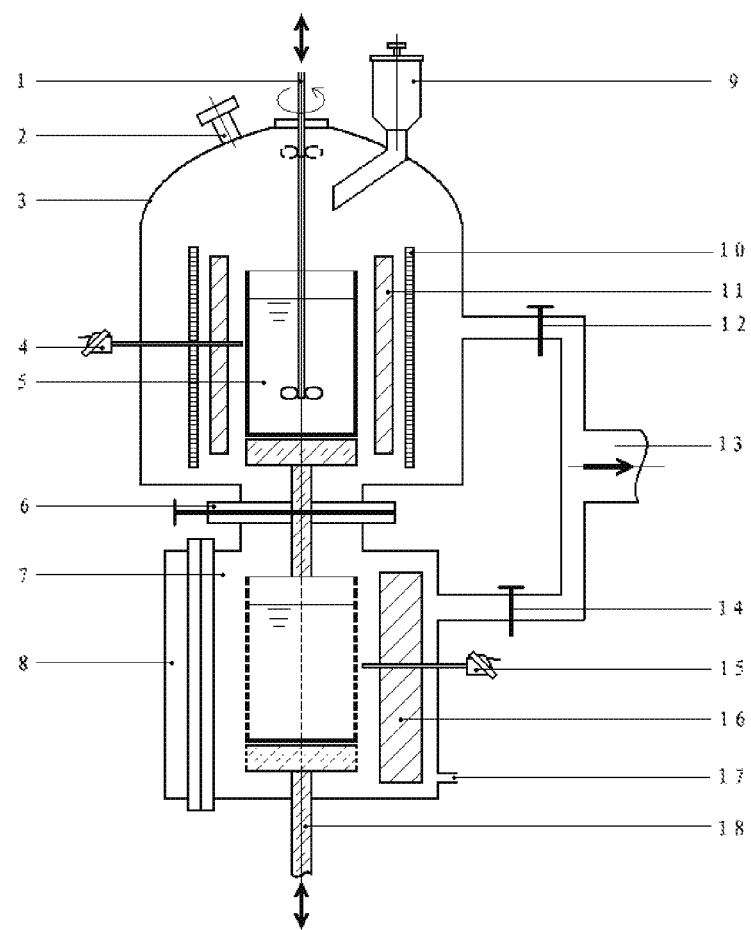
FIG. 2 is an embodiment of the vacuum melting furnace for infrared glass with a vacuum feeding hopper and a thermocouple.

The vacuum melting furnace for infrared glass of this embodiment as shown in FIG. 2, comprises
a furnace body comprising an upper furnace body 3 and a lower furnace body 7 located below the upper furnace body. Both of the upper furnace body and the lower furnace body are made from heat-resistant stainless steel materials. A bottom portion of the upper furnace body 3 is in connection with a top portion of the lower furnace body 7 via a communication passage. The lower furnace body 7 is provided with a lockable furnace door 8 and a charging port 17, and the upper furnace body is provided with a feeding port, an observation window 2 and an upper heater 11 on a sidewall thereof. The feeding port is in connection with a vacuum feeding hopper 9. The lower furnace body 7 is provided with a lower heater 16 on a sidewall thereof. The upper furnace body and the lower furnace body are respectively provided with a Tungsten-Rhenium thermocouple therein, and the thermocouple has precise temperature control function during the whole process from a room temperature to a high temperature.

The upper heater 11 and the lower heater are led out from one side of the furnace body via a water cooled copper electrode so as to be connected with a three-phase power supply system. The upper heater is made from high temperature resistant metal molybdenum which allows a long term use under a temperature of 1400° C., and the lower heater 16 is high temperature iron-chromium-aluminum heating wire. A heat shield 10 is further arranged outside the upper heater 11. The heat shield 10 comprises multilayer structure consisting of high temperature resistant metal sheets, and allows to reflect thermal radiation of the upper heater 11 into the furnace chamber in vacuum environments, thus improving heating efficiency.

The vacuum melting furnace for infrared glass of this embodiment further comprises a vacuum pumping device 13. The vacuum pumping device 13 is in connection with the upper furnace body 3 via an upper pipeline provided with an upper vacuum valve 12 thereon, and is in connection with the lower furnace body 7 via a lower pipeline provided with a lower vacuum valve 14 thereon.

The vacuum melting furnace for infrared glass of this embodiment further comprises a crucible 5 arranged inside the furnace body. The crucible 5 is alternatively made from materials chosen from high temperature resistant ceramics, platinum, and platinum-rhodium alloy. A stirrer 1 is arranged on a top portion of the upper furnace body 3. The stirrer 1 is adapted to extend into the crucible 5 for rotating and stirring, and is adapted to move up and down in a vertical direction.

The vacuum melting furnace for infrared glass of this embodiment further comprises a lifting device 18 arranged in connection with the crucible and adapted to drive the crucible to move up and down within the furnace body. The lifting device 18 is made from heat resistant stainless steel materials, and is provided with a circular platform on a top portion thereof for supporting the crucible 5. The crucible 5 is placed on the lifting device 18 so both of them are moved up and down together in a vertical direction under driving by a motor located on a lower portion of the furnace body.

Wherein, the communication passage has a dimension adapted to allow the crucible to pass through, and is provided with a gate valve 6 thereon for isolating the upper furnace body 3 from the lower furnace body 7. The gate valve 6 is arranged in a middle portion of the furnace body, used for separating the furnace body into an upper furnace body 3 and a lower furnace body 7, and for controlling to connect or isolate the communication of the upper furnace body 3 and the lower furnace body 7, thus allowing the upper furnace body 3 to be still maintained at a vacuum state when the lower furnace body 7 is opened to the atmosphere.

In order to ensure normal operation state of the device, the upper furnace body, the lower furnace body and the lifting device are all designed to have sandwich structure inside which cooling circulation water is added to cool the entire furnace body. The cooling circulation water has a water pressure of 0.1 Mpa and a temperature not exceeding 40° C.

Further, the melting method for infrared glass provided in this embodiment comprises following steps:

(1) following glass raw materials are weighed out accurately: 5.5 kg germanium oxide, 2.6 kg aluminium oxide, 1.8 kg lead oxide, 0.8 kg barium carbonate, 0.5 kg titanium oxide, 0.4 kg sodium carbonate, and then they are mixed uniformly to form germanate infrared glass batch, which is then placed into an atmospheric melting furnace for melting under atmospheric pressure conditions to form a molten glass which is then cooled and pulverized to form an infrared glass cullet;

(2) the furnace door 8 of the vacuum melting furnace is opened, and the infrared glass cullet is put into the crucible 5;

(3) the gate valve 6 is opened, then the crucible 5 is moved upwardly into the upper furnace body 3 by means of the lifting device, then the furnace door 8 is closed, and vacuum pumping is performed on the upper furnace body 3 and the lower furnace body 7 by means of the vacuum pumping device 13 to maintain a vacuum degree of 1 Pa inside the upper furnace body and the lower furnace body;

(4) the upper furnace body 3 is heated by means of the upper heater 11 to maintain a temperature of 1400° C. inside the upper furnace body until the infrared glass cullet melts completely; after completely melting of the cullet in the crucible, the glass cullet which is not put into the crucible is added in batches through the vacuum feeding hopper 9 until all of the cullet melts completely; at the same time, the lower furnace body 7 is heated by means of the lower heater 16 to maintain a temperature of 800° C. inside the lower furnace body, so as to provide heat preservation for the crucible and glass as the crucible is moved downward into the lower furnace body at the discharging stage, which can effectively avoid great temperature decrease of the glass after its opening to the atmosphere during the discharging process, otherwise, a too low temperature of the glass will lead to increase of viscosity, which is harmful for pouring out and molding, and in addition, an too low temperature will also lead to crystallization and devitrification of the glass, which will cause influence to the spectrum transmittance.

(5) after the infrared glass cullet melts completely, the vacuum degree inside the upper furnace body is increased to 0.001 Pa, and the temperature is increased to 1400° C., and then the stirrer 1 is started to allow the infrared glass homogenizing and fining; and (6) after completion of the step (5), the crucible is moved downwardly into the lower furnace body 7 by means of the lifting device 18, then the gate valve 6 is closed, the vacuum degree inside the upper furnace body is restored to 0.1 Pa, then vacuum pumping on the lower furnace body 7 is stopped, the charging port 17 is opened and air is charged into the lower furnace body 7 until restoring atmospheric pressure, then the furnace door 8 is opened, and the crucible 5 is taken out for discharging at atmospheric pressure; after completion of discharging at atmospheric pressure, new infrared glass cullet is put into the crucible, then the furnace door is closed, and vacuum pumping is performed on the lower furnace body to maintain a vacuum degree of 0.1 Pa; so a continuous production is achieved by repeating the steps (3)-(6).

Embodiment 3

The vacuum melting furnace for infrared glass of this embodiment, comprises a furnace body comprising an upper furnace body 3 and a lower furnace body 7 located below the upper furnace body. Both of the upper furnace body and the lower furnace body are made from heat-resistant stainless steel materials. A bottom portion of the upper furnace body 3 is in connection with a top portion of the lower furnace body 7 via a communication passage. The lower furnace body 7 is provided with a lockable furnace door 8 and a charging port 17, and the upper furnace body is provided with a feeding port, an observation window 2 and an upper heater 11 on a sidewall thereof. The feeding port is in connection with a vacuum feeding hopper 9. The lower furnace body 7 is provided with a lower heater 16 on a sidewall thereof. The upper furnace body and the lower furnace body are respectively provided with a Tungsten-Rhenium thermocouple therein, and the thermocouple has precise temperature control function during the whole process from a room temperature to a high temperature.

The upper heater 11 and the lower heater are led out from one side of the furnace body via a water cooled copper electrode so as to be connected with a three-phase power supply system. The upper heater is made from high temperature resistant metal molybdenum which allows a long term use under a temperature of 1600° C., and the lower heater 16 is high temperature iron-chromium-aluminum heating wire. A heat shield 10 is further arranged outside the upper heater 11. The heat shield 10 comprises multilayer structure consisting of high temperature resistant metal sheets, and allows to reflect thermal radiation of the upper heater 11 into the furnace chamber in vacuum environments, thus improving heating efficiency.

The vacuum melting furnace for infrared glass of this embodiment further comprises a vacuum pumping device 13. The vacuum pumping device 13 is in connection with the upper furnace body 3 via an upper pipeline provided with an upper vacuum valve 12 thereon, and is in connection with the lower furnace body 7 via a lower pipeline provided with a lower vacuum valve 14 thereon.

The vacuum melting furnace for infrared glass of this embodiment further comprises a crucible 5 arranged inside the furnace body. The crucible 5 is alternatively made from materials chosen from high temperature resistant ceramics, platinum, and platinum-rhodium alloy. A stirrer 1 is arranged on a top portion of the upper furnace body 3. The stirrer 1 is adapted to extend into the crucible 5 for rotating and stirring, and is adapted to move up and down in a vertical direction.

The vacuum melting furnace for infrared glass of this embodiment further comprises a lifting device 18 arranged in connection with the crucible and adapted to drive the crucible to move up and down within the furnace body. The lifting device 18 is made from heat resistant stainless steel materials, and is provided with a circular platform on a top portion thereof for supporting the crucible 5. The crucible 5 is placed on the lifting device 18 so both of them are moved up and down together in a vertical direction under driving by a motor located on a lower portion of the furnace body.

Wherein, the communication passage has a dimension adapted to allow the crucible to pass through, and is provided with a gate valve 6 thereon for isolating the upper furnace body 3 from the lower furnace body 7. The gate valve 6 is arranged in a middle portion of the furnace body, used for separating the furnace body into an upper furnace body 3 and a lower furnace body 7, and for controlling to connect or isolate the communication of the upper furnace body 3 and the lower furnace body 7, thus allowing the upper furnace body 3 to be still maintained at a vacuum state when the lower furnace body 7 is opened to the atmosphere.

In order to ensure normal operation state of the device, the upper furnace body, the lower furnace body and the lifting device are all designed to have sandwich structure inside which cooling circulation water is added to cool the entire furnace body. The cooling circulation water has a water pressure of 0.3 Mpa and a temperature not exceeding 40° C.

Further, the melting method for infrared glass provided in this embodiment comprises following steps:

(1) following glass raw materials are weighed out accurately: 4.5 kg calcium carbonate, 4.4 kg aluminium oxide, 1.6 kg barium carbonate, 0.8 kg tellurium oxide, 0.4 kg lanthanum oxide, and 0.5 kg magnesium oxide, and then they are mixed uniformly to form aluminate infrared glass batch, which is then placed into an atmospheric melting furnace for melting under atmospheric pressure conditions to form a molten glass which is then cooled and pulverized to form an infrared glass cullet;

(2) the furnace door 8 of the vacuum melting furnace is opened, and the infrared glass cullet is put into the crucible 5;

(3) the gate valve 6 is opened, and the crucible 5 is moved upwardly into the upper furnace body 3 by means of the lifting device, then the furnace door 8 is closed, and vacuum pumping is performed on the upper furnace body 3 and the lower furnace body 7 by means of the vacuum pumping device 13 to maintain a vacuum degree of 1 Pa inside the upper furnace body and the lower furnace body;

(4) the upper furnace body 3 is heated by means of the upper heater 11 to maintain a temperature of 1400° C. inside the upper furnace body until the infrared glass cullet melts completely; after completely melting of the cullet in the crucible, the glass cullet which is not put into the crucible is added in batches through the vacuum feeding hopper 9 until all of the cullet melts completely; at the same time, the lower furnace body 7 is heated by means of the lower heater 16 to maintain a temperature of 1200° C. inside the lower furnace body, so as to provide heat preservation for the crucible and glass as the crucible is moved downward in to the lower furnace body at the discharging stage, which can effectively avoid great temperature decrease of the glass after its opening to the atmosphere during the discharging process, otherwise, a too low temperature of the glass will lead to increase of viscosity, which is harmful for pouring out and molding, and in addition, an too low temperature will also lead to crystallization and devitrification of the glass, which will cause influence to the spectrum transmittance.

(5) after the infrared glass cullet melts completely, the vacuum degree inside the upper furnace body is increased to 0.01 Pa, and the temperature is increased to 1600° C., and then the stirrer 1 is started to allow the infrared glass homogenizing and fining; and (6) after completion of the step (5), the crucible is moved downwardly into the lower furnace body 7 by means of the lifting device 18, then the gate valve 6 is closed, the vacuum degree inside the upper furnace body is restored to 1 Pa, and vacuum pumping on the lower furnace body 7 is stopped, then the charging port 17 is opened and air is charged into the lower furnace body 7 until restoring atmospheric pressure, then the furnace door 8 is opened, and the crucible 5 is taken out for discharging at atmospheric pressure; after completion of discharging at atmospheric pressure, new infrared glass cullet is put into the crucible, then the furnace door is closed, and vacuum pumping is performed on the lower furnace body to maintain a vacuum degree of 1 Pa; so a continuous production is achieved by repeating the steps (3)-(6).

Figure 3:
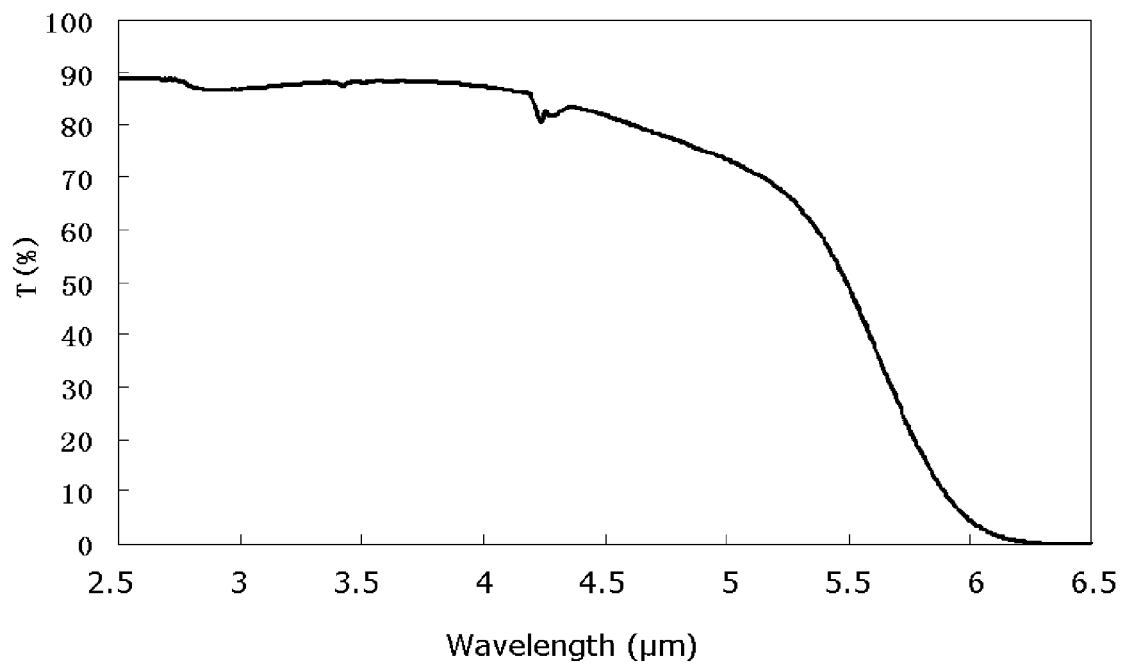
FIG. 3 is an infrared spectrum curve of the infrared glass according to an embodiment of the present invention.

The infrared spectrum curve of the infrared glass obtained in this embodiment is shown in FIG. 3, from which it can be seen that the hydroxyl absorption peak around 2.9 μm is very weak, indicating that water in the glass structure is effectively eliminated.

Obviously, the aforementioned embodiments are merely intended for clearly describing the examples, rather than limiting the implementation scope of the invention. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. A vacuum melting furnace for infrared glass, comprising a furnace body, comprising an upper furnace body and a lower furnace body located below said upper furnace body; a bottom portion of said upper furnace body being in connection with a top portion of said lower furnace body via a communication passage; said furnace body being provided with a lockable furnace door, and being provided with a heater on a sidewall thereof;

a vacuum pumping device in connection with said upper furnace body and said lower furnace body respectively;

a crucible arranged inside said furnace body; a lifting device arranged in connection with said crucible and adapted to drive said crucible to move up and down within said furnace body; said communication passage having a dimension adapted to allow said crucible to pass through; and a stirrer arranged inside said upper furnace body and adapted to extend into said crucible for stirring as said crucible moves up into said upper furnace body;

wherein, said communication passage is provided with a gate valve thereon for isolating said upper furnace body from said lower furnace body, and said lower furnace body is provided with a charging port thereon.

2. The vacuum melting furnace for infrared glass of claim 1, wherein, said upper furnace body is provided with an upper heater on an inner side of furnace wall thereof, said lower furnace body is provide with a lower heater on an inner side of furnace wall thereof, and said upper furnace body and said lower furnace body are respectively provided with a thermocouple therein.

3. The vacuum melting furnace for infrared glass of claim 2, wherein, a heat shield is further arranged outside said upper heater.

4. The vacuum melting furnace for infrared glass of claim 2, wherein, said upper heater and said lower heater are both resistance heaters, and said resistance heater is in connection with a three-phase power supply system via a copper electrode, and said lower heater is a high temperature iron-chromium-aluminum heating wires.

5. The vacuum melting furnace for infrared glass of claim 2, wherein, said vacuum pumping device is in connection with said upper furnace body via an upper pipeline which is provided with an upper vacuum valve thereon, and is in connection with said lower furnace body via a lower pipeline which is provided with a lower vacuum valve thereon.

6. The vacuum melting furnace for infrared glass of claim 2, wherein, said vacuum pumping device is in connection with said upper furnace body via an upper pipeline which is provided with an upper vacuum valve thereon, and is in connection with said lower furnace body via a lower pipeline which is provided with a lower vacuum valve thereon;

said upper heater and said lower heater are both resistance heaters, and said resistance heater is in connection with a three-phase power supply system via a copper electrode, and said lower heater is a high temperature iron-chromium-aluminum heating wires.

7. The vacuum melting furnace for infrared glass of claim 2, wherein,
said vacuum pumping device is in connection with said upper furnace body via an upper pipeline which is provided with an upper vacuum valve thereon, and is in connection with said lower furnace body via a lower pipeline which is provided with a lower vacuum valve thereon;
a heat shield is further arranged outside said upper heater.

8. The vacuum melting furnace for infrared glass of claim 2, wherein, said upper heater and said lower heater are both resistance heaters, and said resistance heater is in connection with a three-phase power supply system via a copper electrode, and said lower heater is a high temperature iron-chromium-aluminum heating wires;
a heat shield is further arranged outside said upper heater.

9. The vacuum melting furnace for infrared glass of claim 2, wherein,
said vacuum pumping device is in connection with said upper furnace body via an upper pipeline which is provided with an upper vacuum valve thereon, and is in connection with said lower furnace body via a lower pipeline which is provided with a lower vacuum valve thereon;
said upper heater and said lower heater are both resistance heaters, and said resistance heater is in connection with a three-phase power supply system via a copper electrode, and said lower heater is a high temperature iron-chromium-aluminum heating wires;
a heat shield is further arranged outside said upper heater.

10. The vacuum melting furnace for infrared glass of claim 1, wherein, said vacuum pumping device is in connection with said upper furnace body via an upper pipeline which is provided with an upper vacuum valve thereon, and is in connection with said lower furnace body via a lower pipeline which is provided with a lower vacuum valve thereon.

11. A melting system for infrared glass comprises an atmospheric melting furnace and the vacuum melting furnace of claim 1.

12. A melting method for infrared glass using the melting system of claim 11, which comprises following steps:
(1) weighing out various glass raw materials and mixing them to form a glass batch material which is then placed into an atmospheric melting furnace for melting under atmospheric pressure conditions to form a molten glass which is then cooled and pulverized to form an infrared glass cullet used for vacuum melting;
(2) opening the furnace door of the vacuum melting furnace, and putting said infrared glass cullet into the crucible;
(3) opening the gate valve, moving the crucible upward into the upper furnace body by means of the lifting device, closing the furnace door, and performing vacuum pumping on said upper furnace body and said lower furnace body by means of the vacuum pumping device to maintain a vacuum degree of 0.1-1 Pa inside said upper furnace body and said lower furnace body;
(4) heating said upper furnace body by means of the heater to maintain a temperature of 1300-1400° C. inside said upper furnace body until said infrared glass cullet melts completely;
(5) after said infrared glass cullet melts completely, starting the stirrer to allow said infrared glass homogenizing and fining; and
(6) after completion of the step (5), moving the crucible downward into the lower furnace body by means of the lifting device, closing the gate valve and stopping vacuum pumping on said lower furnace body, opening the charging port and charging air into said lower furnace body until restoring atmospheric pressure, opening the furnace door, and taking out the crucible for discharging at atmospheric pressure.

13. The melting method for infrared glass of claim 12, wherein, in the step (6), said lower furnace body is heated by the heater to maintain a temperature of 800-1200° C. inside said lower furnace body.

14. The melting method for infrared glass of claim 13, wherein, in the step (5), after said infrared glass cullet melts completely, the vacuum degree inside said upper furnace body is increased to 0.001-0.01 Pa and the temperature is increased to 1400-1600° C. before starting the stirrer; and in the step (6), after closing the gate valve, the vacuum degree inside said upper furnace body is restored to 0.1-1 Pa.

15. The melting method for infrared glass of claim 13, wherein, after completion of discharging at atmospheric pressure in the step (6), new infrared glass cullet is put into the crucible, then the furnace door is closed, and said lower furnace body is kept a vacuum degree of 0.1-1 Pa by performing vacuum pumping; so a continuous production is achieved by repeating the steps (3)-(6).

16. The melting method for infrared glass of claim 13, wherein,
in the step (5), after said infrared glass cullet melts completely, the vacuum degree inside said upper furnace body is increased to 0.001-0.01 Pa and the temperature is increased to 1400-1600° C. before starting the stirrer; and in the step (6), after closing the gate valve, the vacuum degree inside said upper furnace body is restored to 0.1-1 Pa;
after completion of discharging at atmospheric pressure in the step (6), new infrared glass cullet is put into the crucible, then the furnace door is closed, and said lower furnace body is kept a vacuum degree of 0.1-1 Pa by performing vacuum pumping; so a continuous production is achieved by repeating the steps (3)-(6).

17. The melting method for infrared glass of claim 12, wherein, in the step (5), after said infrared glass cullet melts completely, the vacuum degree inside said upper furnace body is increased to 0.001-0.01 Pa and the temperature is increased to 1400-1600° C. before starting the stirrer; and in the step (6), after closing the gate valve, the vacuum degree inside said upper furnace body is restored to 0.1-1 Pa.

18. The melting method for infrared glass of claim 12, wherein, after completion of discharging at atmospheric pressure in the step (6), new infrared glass cullet is put into the crucible, then the furnace door is closed, and said lower furnace body is kept a vacuum degree of 0.1-1 Pa by performing vacuum pumping; so a continuous production is achieved by repeating the steps (3)-(6).

19. The melting method for infrared glass of claim 12, wherein, in the step (5), after said infrared glass cullet melts completely, the vacuum degree inside said upper furnace body is increased to 0.001-0.01 Pa and the temperature is increased to 1400-1600° C. before starting the stirrer; and in the step (6), after closing the gate valve, the vacuum degree inside said upper furnace body is restored to 0.1-1 Pa;

after completion of discharging at atmospheric pressure in the step (6), new infrared glass cullet is put into the crucible, then the furnace door is closed, and said lower furnace body is kept a vacuum degree of 0.1-1 Pa by performing vacuum pumping; so a continuous production is achieved by repeating the steps (3)-(6).

* * * * *